United States Patent [19]

Donaldson

[11] 4,112,047
[45] Sep. 5, 1978

[54] PRETREATMENT SYSTEM FOR GOETHITIC BAUXITES

[75] Inventor: Donald J. Donaldson, Orinda, Calif.

[73] Assignee: Kaiser Aluminum & Chemical Corporation, Oakland, Calif.

[21] Appl. No.: 804,841

[22] Filed: Jun. 8, 1977

[51] Int. Cl.² ............................................. C01F 7/06
[52] U.S. Cl. ................................. 423/123; 423/111; 423/119; 423/121; 423/138
[58] Field of Search ............... 423/111, 119, 121, 123

[56] References Cited

U.S. PATENT DOCUMENTS

| | | | |
|---|---|---|---|
| 3,095,280 | 6/1963 | Soudan et al. | 423/123 |
| 3,306,216 | 2/1967 | Warman | 417/92 |
| 3,413,087 | 11/1968 | Roberts | 423/123 |
| 3,497,317 | 2/1970 | Tusche | 423/123 |
| 3,582,268 | 6/1971 | Sato et al. | 423/600 |
| 3,737,514 | 6/1973 | King | 423/121 |
| 3,738,411 | 6/1973 | Lazar | 423/121 |
| 3,944,648 | 3/1976 | Solymar et al. | 423/121 |
| 3,966,874 | 6/1976 | Featherson et al. | 423/121 |
| 4,026,989 | 5/1977 | Orban et al. | 423/121 |

*Primary Examiner*—Herbert T. Carter

*Attorney, Agent, or Firm*—Paul E. Calrow; Andrew E. Barlay

[57] ABSTRACT

A pretreatment system is provided for transforming the goethite constituent [FeO(OH)] of goethitic bauxites to hematite and/or magnetite at high temperatures and pressures. The system employs a number of float-type, liquid displacement pressure pumps, both for charging caustic-containing bauxite slurries of high solids concentration to the system and for discharging the treated slurries. The system operates at temperatures in excess of 250° C and up to temperatures required for the total conversion of the goethite content to hematite or magnetite which, in turn, significantly increases the yield of recoverable alumina. Since the slurry to be pretreated is of high solids concentration, e.g., in excess of 30% by weight and up to about 55-60% by weight, the size of the pressure-resistant equipment is considerably smaller than the size required for conventional pretreatment system operating at much lower solids concentrations and due to the use of the float-type pumps, maintenance, erosion and other mechanical problems associated with the use of customarily employed high pressure pumps and slurry pressure control valves are substantially eliminated.

7 Claims, 1 Drawing Figure

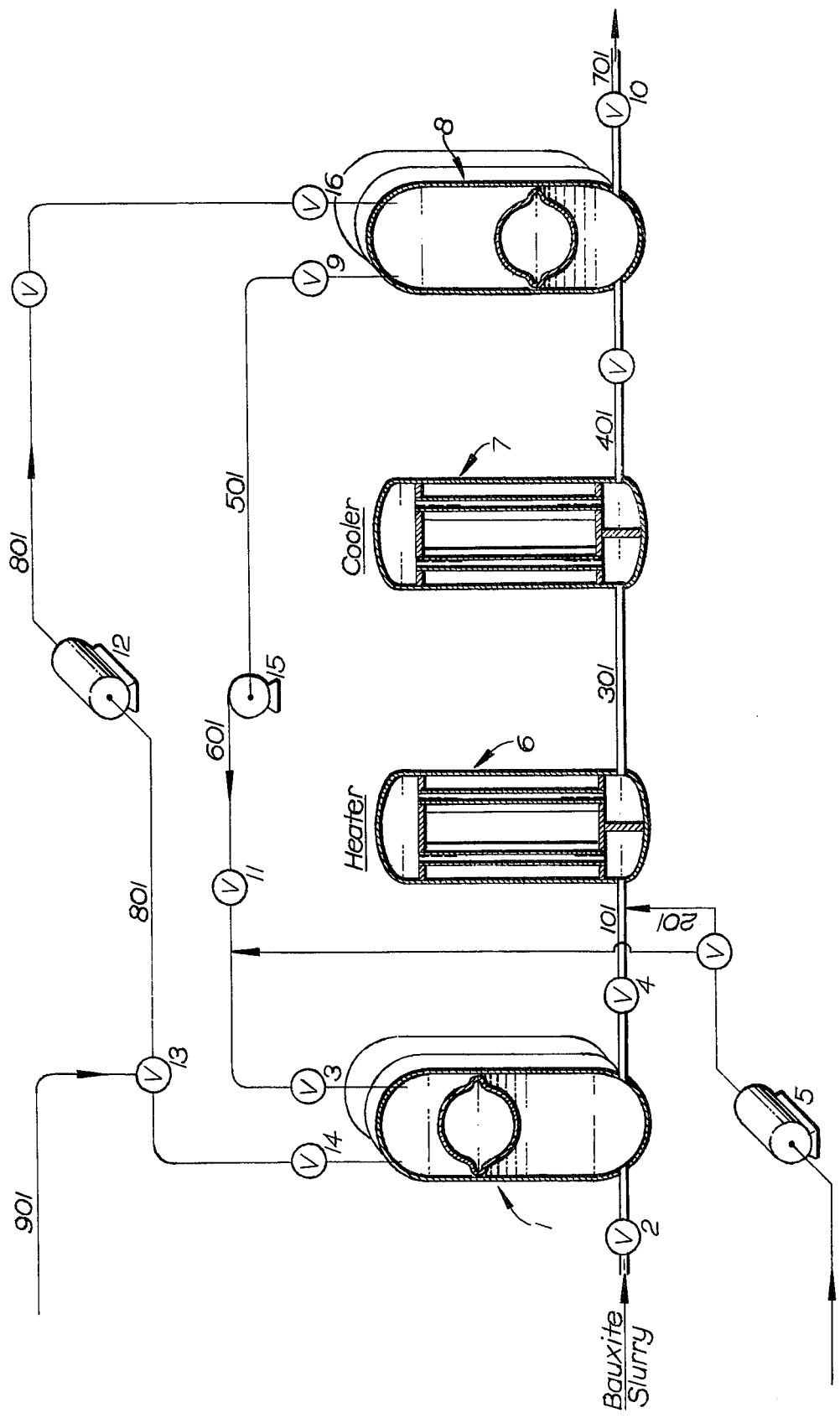

PRETREATMENT SYSTEM FOR GOETHITIC BAUXITES

BACKGROUND OF THE INVENTION

Most of the alumina utilized for the making of metallic aluminum is made by the Bayer process which involves the digestion of bauxite in a caustic medium. Digestion results in a caustic aluminate liquor from which alumina hydrate is recovered by precipitation. Bauxites used in the Bayer process contain, besides alumina values, a significant quantity of iron and depending on the source of bauxite, a considerable portion of the iron content can be present in the form of goethite [FeO(OH)]. Processing of goethitic bauxites is difficult, since generally high temperatures (in excess of about 245° C) and/or additives, such as lime, NaCl or $Na_2SO_4$, are required to convert the goethite content to hematite or magnetite. This conversion is desirable for many reasons, for example, it allows recovery of alumina from the bauxite in increased yield, further the settling of the digestion residue, the so-called "red mud", is substantially improved.

The problem of goethite to hematite and/or magnetite conversion has been known for many years. For example, Hungarian researchers in the 1950's have published several papers relating to the treatment of goethitic bauxites. Thus, for example, in an article by Lanyi in the Yearbook of The Hungarian Research Institute for Non-Ferrous Metals, Volume 1, pp. 5-28, 1956, conversion of the goethite content of Hungarian bauxites to well-settling magnetite has been achieved by the use of a tube digester operating at temperatures at about 300° C and higher. Conversion was ascertained by the brownish color of the mud produced and also by X-ray analysis.

In U.S. Pat. No. 3,737,514 (King), a process has been disclosed for the treatment of goethite and titanium containing aluminiferous ores resulting in increased alumina recovery from the ores. The process involves a two-stage digestion method in the presence of a calcium compound added in an amount at least sufficient to convert substantially all of the titanium content of the ore to calcium titanate. The first stage of the digestion is accomplished at about 280° to 350° C, while the second stage of the process proceeds at about 200° to 255° C.

In German Offenlegungsschrift No. 2,335,732 (published Jan. 31, 1974), a process is described for the conversion of the goethite content of gibbsitic bauxites to hematite and magnetite by digesting a caustic slurry of the bauxites at the temperatures between 220°-280° C in the presence of 1-6% by weight CaO and 0.5-12% by weight NaCl. The combination of CaO and NaCl, according to this reference, allows conversion of goethite to hematite at the reported temperatures without using a pretreatment.

German Offenlegungsschrift No. 2,431,857 (published Jan. 30, 1975) discloses the conversion of the goethite content of boehmitic and/or diasporic bauxites to hematite at 180°-300° C in the presence of a catalytically acting combination of 2-6% by weight CaO and a small quantity of sulfate ion, generally 1.0 to 14 g/l in the digestion mixture.

In U.S. Pat. No. 3,966,874 (Featherston et al.), a process is shown capable of converting the goethite content of boehmite and/or diaspore containing bauxites. The process of this reference employs a two-stage method, wherein in the first stage, a caustic slurry of the bauxite is pretreated at a temperature at least 200° C, followed by addition of a calcium compound and digestion at a temperature of at least 225° C, preferably at about 230°-250° C.

The extent of prior art dealing with the subject of goethite to hematite and/or magnetite conversion clearly indicates the importance of this area to produce Bayer process alumina. This becomes even more significant with the gradual decrease in the quality of available bauxites employed for the production of alumina. More and more bauxites of high goethite and diaspore content are being utilized and recovery of alumina values from these lower grade ores pose not only technical problems but also decreasing alumina yields due to the increasing alumina content occluded in the goethitic and/or diasporic lattice of the ore. The prior art processes, operating at temperatures at or below about 250° C with or without goethite to hematite enhancing additives, are only capable of converting a fraction of the total goethite content of these low grade bauxites and consequently the yield of alumina recovered from these ores is far from the values desired from an economic point of view. On the other hand, digestion processes operating at temperatures in excess of about 280° C with accompanying high pressures, such as 1000-1500 psi (68-102 atmospheres) can obtain the desired alumina yield from these low grade ores, but the equipment involved in the digestion at these process conditions, particularly when the large volumes encountered in the Bayer process are considered, require complex and expensive installations. For example, tube digesters of extensive length (in excess of about 1000 m), have been recommended for this purpose where digestion of the bauxite slurry takes place at about 300° C under highly turbulent flow. Turbulence is a necessary requirement of this type of process, otherwise deposition of scale takes place on the inner walls of the long tube resulting in blockage, reduced flow and inadequate heat transfer. The turbulent flow in this system requires an excessively long and straight flow pattern. Also, the high rate of turbulence exerts a steady stress on the tube, which, in combination with the high pressures utilized, renders the equipment subject to frequent maintenance.

The use of conventional digestion design at these temperatures and pressures requires not only high input of heat energy but also a large number of high pressure digester vessels, flash tanks and liquor heaters capable of safely withstanding the pressures generated. Due to the large volumes to be treated under these conditions, the construction cost of digestion vessels of suitable size becomes prohibitive and economically, as well as technically, undesirable. Consequently, up until now, the Bayer process operator had to accept a compromise between alumina yield and process conditions, resulting in lower alumina recoveries in the existing equipment.

It has now been discovered that it is economically possible and technically feasible to obtain maximum alumina recoveries from goethitic bauxites at high temperatures and pressures, for example, in excess of about 250° C. This is accomplished in a novel pretreatment system where bauxite slurries of high solids concentrations are brought to the goethite to hematite and/or magnetite transformation temperature without requiring complex and expensive equipment capable of accommodating the large volumes usually encountered in the Bayer process. Due to the treatment in this system of a highly concentrated bauxite slurry, the heat input required for the aforementioned transformation is significantly less than required either in the tube digesters or conventional digesters. The novel pretreatment system consists of at least one float-type, liquid displacement pressure pump employed to charge bauxite slurry of high solids content at high pressures into a heating device where the slurry is heated to the goethite transformation temperature or above. The heated slurry is then continuously cooled without flashing while still under high pressure, to the conventional Bayer process digestion temperatures in a suitable cooling means. This high pressure slurry is then charged to at least one float-type, liquid displacement pump where its pressure is reduced without flashing and is then charged by this pump to the conventional Bayer process digester. The use of the float-type liquid displacement pumps in combination with the heating and cooling means of the system allows high temperature and pressure pretreatment of the bauxite in a simplified, economically advantageous manner.

BRIEF SUMMARY OF THE INVENTION

In the treatment of goethite containing bauxites by the Bayer process for the recovery of the alumina content of the bauxites involving a pretreatment of a caustic slurry of bauxite at elevated temperatures followed by digestion of the pretreated slurry under conventional Bayer process conditions, an improved pretreatment system is provided which consists of a bauxite slurry charging stage, a heating stage, a cooling stage and a slurry discharge stage. In the slurry charging stage, a slurry of high solids concentration, e.g., in excess of about 30% by weight solids content is introduced into a float-type, liquid displacement pressure pump or a number of such series-connected pumps where the pressure of the slurry is raised to a pressure corresponding to at least about the vapor pressure of steam at a temperature in the range of about 260° C or higher, the pressurized slurry is then introduced to the heating stage where the temperature of the slurry is raised to the temperature required for the conversion of goethite to hematite or magnetite, the heated slurry is then transferred to the cooling stage, where the temperature of the slurry is decreased without flashing off steam to the temperature normally employed for Bayer process digestion; and then the pretreated slurry is charged to a float-type, liquid displacement pressure pump or a number of such series-connected pumps from where the pretreated slurry is charged to the conventional Bayer process digestion system. The high pressure of the pretreated slurry in the slurry discharge stage is used to displace liquid from the float-type pump at high pressure, this pressurized liquid is then used in a cyclic manner to charge through the first stage pump(s) untreated slurry at high pressure to the heating stage. Employment of the float-type pumps in the charging and discharging stages, coupled with cooling in the cooling stage without flash-off of steam, allows pretreatment of slurries of high solids content at elevated pressures. Conventional pumps generally utilized for pumping slurries of high solids content at elevated pressures are incapable of coping with the erosive and corrosive environment of the pretreatment and wear-out prematurely.

BRIEF DESCRIPTION OF THE FIGURE

The FIGURE schematically represents the high temperature and pressure pretreatment system for bauxite slurries of high solids content.

DETAILED DESCRIPTION OF THE INVENTION

This invention relates to a pretreatment system for goethitic bauxites containing lattice-bound alumina values. More particularly, it concerns a high temperature and pressure pretreatment system for transforming the goethite content of bauxites to hematite and/or magnetite. In the system, bauxite slurry of high solids concentration is pretreated at temperatures in excess of about 260° C at corresponding pressures, followed by digestion of the pretreated slurry under conventional Bayer process conditions.

For the purposes of the present invention, the term "conventional Bayer process conditions" refers to digestion of bauxite in a caustic medium of about 130–310 g/l caustic concentration expressed as g/l $Na_2CO_3$, at temperatures in the temperature range of about 175°–250° C at pressures essentially corresponding to the steam pressures generated by the temperatures utilized.

The expressions "bauxite slurry of high solids concentration" and "bauxite slurry of high solids content" for the purposes of the invention mean bauxite slurried in a caustic medium, wherein the slurry contains bauxite in the range of about 30–60% by weight and the concentration of caustic in this slurry is in the range of about 130–320 grams/liter.

The novel pretreatment system of the present invention consists of a first stage wherein at least one or a number of series-connected, float-type, cylindrical, liquid displacement pressure transfer pump is employed into which the bauxite slurry is charged, thus displacing the liquid present in the pump. Upon filling of the cylinder of the pump with the bauxite slurry, the slurry is discharged at a high pressure, that is, above the pressure corresponding to the vapor pressure to be expected at the pretreatment temperature, (which is due to the presence of caustic in the slurry) to a heating stage where the pressurized slurry is heated to a temperature where the desired transformation of goethite to hematite or magnetite can be readily accomplished. The heated and pressurized slurry is then introduced to a cooling stage consisting of a suitable cooling device where the temperature of the pressurized slurry is reduced to a temperature generally employed in the conventional Bayer process digestion of bauxites. Cooling of the hot, pressurized slurry proceeds without flashing. Subsequently, the cooled, but still pressurized slurry, is charged to the fourth stage of the system consisting of at least one float-type, cylindrical, liquid displacement pressure transfer pump, such as employed for charging the slurry to the pretreatment system. This stage, equally to the first stage, can consist of a number of series-connected, float-type pumps. When the fourth stage slurry discharge pump is essentially filled with the slurry, then the slurry inlet valves are closed and the slurry outlet valves are opened with the slurry now essentially at the temperature and pressure employed in conventional digestion vessels, for further treatment according to accepted Bayer process technology.

The float-type, cylindrical, liquid displacement pump employed in the instant pretreatment system has been known and a detailed description of its operation is given in U.S. Pat. No. 3,306,216 (Warman), the disclosure of which is made part of the instant specification by reference. Consequently, its construction and operation will only be given to such an extent which allows full understanding of the functioning of the instant pretreatment system.

The float-type, cylindrical, liquid displacement pressure pump is eminently suitable for the transfer of liquids containing abrasive particles dispersed therein, such as bauxite slurries. The pump generally consists of a vertical cylinder in which a float is positioned in such a manner as to allow its rising and descending in the cylinder depending on the liquid level maintained in the pump. The clearance between the inner walls of the cylinder and the float is kept to such an extent that communication between the liquids above and below the float is restricted to a minimum, but still allowing the frictionless movement of the float in the cylinder. Transfer of liquids with this type of pump is accomplished by liquid displacement, which is done, for example, by charging the cylinder empty of slurry but full of liquid from the bottom with the float being in down position with a slurry or heavier liquid and continuing the charging until the float reaches the top of the cylinder. After the charging valve is closed, a valve positioned at the top of the cylinder is opened and a liquid, generally of lower specific weight, is pumped into the cylinder through this valve at the desired pressure. On opening a discharge valve at the bottom of the cylinder, the slurry from the cylinder can be displaced by the pumped-in liquid into a system at the desired pressure. Since the float-type pump described above operates cyclically, to avoid variations in flow rates, particularly where continuous flow is desired, more than one pump unit can be combined in parallel relationship through suitable valved connections, to achieve this goal.

Applying now the operating principle of the float-type pump to the instant bauxite slurry pretreatment system, a bauxite slurry of high solids concentration is charged to at least one pump with the float in down position. The slurry can be introduced at any desired pressure. High pressures are not required for filling of the pump cylinder. Thus, charging pressures of about 50–100 psi (3.4–6.8 atm.) are sufficient to fill the cylinder. When the pump is filled with the bauxite slurry, which, for example, can be at any desired temperature, the float rises to the top of the cylinder and at this point can actuate a suitable device which will shut off the flow of the slurry through the bottom valve by closing the valve. If more than one float-type pump is used in the slurry pretreatment system, simultaneously the signal which shuts off the charging valve to the first pump can open the valve to a second pump for charging purposes.

In the next stage of the instant pretreatment system, the slurry displaced from the pump is charged to the heating device. This is accomplished by pumping into the float-type pump through a valve located above the float in up position a liquid having a lower specific weight than the bauxite slurry. In the instant pretreatment system, the displacement liquid can be a caustic solution, for example, aqueous caustic solution, such as used to establish the required caustic concentration in slurries to be treated in the conventional Bayer process digesters associated with the pretreatment system. Other caustic solutions, such as generally encountered in the conventional Bayer process, can also be used. These include "spent liquor" which results after a substantial quantity of alumina is removed by precipitation from supersaturated sodium aluminate solutions.

The pressure at which the displacement liquid is charged to the pump is selected to be at least equal to the pressure at which the bauxite slurry is to be discharged from the pump and transferred to the heating device. To attain the desired pressure, any conventional pump can be employed, such as centrifugal pumps, in the manner shown, for example, in the FIGURE, where a pump is being used both to displace the slurry from the float-type pump and to impart increased pressure to the slurry being charged to the heating device.

The total transformation of the goethite constituent of the bauxite usually requires temperatures in excess of about 260° C. At this temperature, the water vapor pressure is only about 675 psi (about 46 atm.). Since, however, the slurry contains a significant quantity of caustic, this causes a boiling point elevation with corresponding reduction in vapor pressure. Thus, the actual pressure in the system depends on the caustic concentration of the slurry. The pressurized bauxite slurry is then introduced into the second stage consisting of a heating device where it is heated to a temperature in excess of about 260° C, preferably to a temperature in the range of about 265° to 315° C requiring operating pressures considerably higher than 675 atm. at 260° C. At these temperatures, rapid transformation of the goethite content of the bauxite can be achieved at relatively short residence times, such as from about a few minutes up to about 3 hours which allows the use of relatively high slurry flow rates through the pretreatment system. Due to the high flow rates which can be utilized in the system, the size of the equipment can be correspondingly reduced and thus contributing to the economy of the entire digestion system.

The heating device of this stage of the pretreatment system can be of conventional design, provided it can rapidly transfer heat to the slurry. Thus, as heating device shell and tube heater may be used and as heating medium, for example, molten salt, can be circulated through the device. Since the slurry in the heater is at temperatures in excess of about 260° C, the pressure in the system is considerable. Consequently, this heater has to be constructed from materials which can withstand these high temperatures and pressures. If more than one float-type pump is utilized for the transfer of bauxite slurry to the heating device, the flow of the bauxite slurry in the pretreatment system can be continuous. It is, however, within the choice of the operator to accomplish the pretreatment in a continuous, semicontinuous or batchwise manner.

From the heating device, the bauxite slurry is transferred to the cooling stage consisting of a suitable cooling device. Since the heating device is not a closed system, transfer of the slurry from the heater to the cooler occurs at essentially the same pressures as utilized in charging the slurry to the heater. The purpose of the cooling device at no pressure reduction is to avoid the problem of a flashing pressure reduction of an abrasive slurry at elevated temperatures and pressures. The cooling device employed in the present pretreatment system can be of any known device, provided upon cooling of the hot and pressurized slurry, no flash-off of steam occurs. A suitable cooling means which allows the cooling of the slurry to a temperature which is conventionally utilized in the usual Bayer process digester is a shell and tube cooler. However, the system of the invention is not limited to this type of cooler. Any other type of cooling device can be utilized in this stage, provided no significant expansion of the slurry can occur in the cooling step.

After the slurry is cooled to the conventional Bayer process digestion temperatures and while still under high pressure, it is charged to at least one float-type liquid displacement pressure pump, such as used in the first stage of the pretreatment system. The high pressure slurry which is introduced at the bottom of the pump displaces the liquid in the pump, which, due to the high pressure imparted to it, can be used as a displacement pumping means for the first stage as shown in the FIGURE, either directly or by increasing its pressure by one or more intermediate pumps, for example, of piston or centrifugal design. When the float-type pump in this stage is filled and the float is in up position, the slurry can be discharged from the pump by, for example, displacing it with the liquid positioned above the float in the first stage. If continuous or semicontinuous operation is required in this last stage of the pretreatment system, more than one float-type pump can be utilized. The pressure employed for the displacement of the pretreated slurry from the last stage float-type pump(s) is above the pressure usually employed in the conventional Bayer process digesters only to the extent required to transfer the slurry to the digesters. Commonly digester vessels operate between about 160 to 580 psi (11–39.5 atm.).

From the last stage of the pretreatment system, the slurry can be directly introduced into conventional Bayer process digesters, where after dilution of the slurry with sufficient quantity of caustic solution to obtain slurries of about 5–12% by weight solids content, extraction of the alumina values from the pretreated bauxite can proceed under the known conditions.

If desired, the pretreated slurry can be premixed with the caustic diluant prior to introduction in the digesters, the use of either of these remains within the choice of the practitioner.

The instant pretreatment system is further illustrated in the following example.

EXAMPLE

Pretreatment of a Jamaican bauxite of high goethite content is accomplished in the pretreatment system of the instant invention. The composition of the bauxite treated in the present system is given in the Table I below.

Table I

| Composition of Jamaican goethitic bauxite | |
| --- | --- |
| Constituent | % by Weight |
| $Al_2O_3$ (total) | 48.05 |
| $SiO_2$ | 1.60 |
| Fe-oxides (as $Fe_2O_3$) | 19.68 |
| $TiO_2$ | 2.63 |
| $P_2O_5$ | 0.68 |

The distribution of iron minerals in this bauxite is shown in Table II.

Table II

| Distribution of iron minerals in Jamaican bauxite | |
| --- | --- |
| Constituent | % by Weight |
| Goethite [FeO(OH)] | 81 |
| Hematite ($Fe_2O_3$) | 19 |
| Magnetite ($Fe_3O_4$) | 0 |

Under normal Bayer process digestion conditions which involve digestion of the bauxite slurry of about 8–12% by weight solids concentration at about 243° C in a caustic solution of about 225 g/l concentration (expressed as $Na_2CO_3$) for a time period of about 30–40 minutes at an alumina-to-caustic (A/C) ratio of about 0.68, no conversion of goethite to hematite occurred. X-ray diffraction studies of the bauxite indicated that the goethite lattice contained about 10.2% by weight $Al_2O_3$, based on the weight of the ore, which, under the digestion conditions employed, remained unavailable for extraction and became lost in the digestion residue (red mud). The same bauxite, when subject to the digestion method shown in U.S. Pat. No. 3,966,874 (Featherston), which involves a preheating step at about 210° C and digestion of about 240° C with lime added to the digestion step, resulted in a goethite-to-hematite conversion of about 80%, with a corresponding increase in $Al_2O_3$ production amounting to about an 86–88% $Al_2O_3$ yield based on the ore. Nevertheless, since only a portion of the goethite content of the bauxite has been converted to hematite, a significant portion of the total $Al_2O_3$ content of the ore remains unavailable to extraction and becomes lost in the digestion residue.

Employment of the instant pretreatment system results in complete conversion of the goethite content of the same Jamaican bauxite. For the description of the operation of the pretreatment system, reference is being made to the FIGURE. Aqueous bauxite slurry of about 100° C temperature, about 45% by weight solids concentration and 200 g/l caustic content, calculated as $Na_2CO_3$, is introduced from a mixing vessel (not shown) through valve 2 into float-type, liquid displacement pressure pump 1 at the rate of about 1200 gpm (about 4540 l/min) with valve 14 of the pump being open. When the float of pump 1 reaches the utmost top position in the cylinder, a suitable sensing device (not shown) actuates a means for closing valve 2 and simultaneously opens valves 3 and 4. Through valve 3 by means of pump 10, a caustic solution of about 220 g/l, expressed as $Na_2CO_3$, is introduced into float-type pump 1 to displace the slurry from the pump and to discharge it through valve 4 and line 101 to heater 6. The pressure used for displacement is kept at about 1200 psi (about 82 atm.). An auxiliary pressure pump 5 is employed to introduce a caustic liquor into line 101 through line 201 at a rate, for example, about 20 gpm (about 76 l/min), such that will assure the slurry entering is at the desired pressure. In the shell and tube heater 6 of the pretreatment system, the temperature of the slurry is raised to about 280° C using molten salt or other suitable agent as heat-transfer medium. To obtain complete goethite to hematite conversion, the average residence time in the heater is chosen to be about 10–20 minutes at a slurry flow rate of about 700–1500 gpm (about 2650–5700 l/min). After the desired average residence time in the second stage of the pretreatment system, the pressurized and heated slurry is introduced into the third stage of the system through line 301, where it is cooled in shell and tube cooler 7 to about 243° C without flashing of steam. The cooled slurry is then introduced through line 401 into the fourth stage, float-type, liquid displacement pressure pump 8 in which the float is in down position and the cylinder above the float being filled with a caustic solution of the same concentration as used for displacement of slurry in pump 1. When valve 9 is in open and valve 10 is in closed position, the cooled, but still pressurized slurry, displaces the caustic solution at high pressure through line 501 and transfer pump 15. This liquor is then introduced into float-type pump 1 through flow control valve 11 and valve 3 through line 601, to serve as displacement liquid for the slurry in pump 1. Upon refilling pump 1 with untreated bauxite slurry with valve 14 open, the caustic solution positioned above the float in pump 1 can be used as displacement liquid for pump 8 through line 801 with simultaneous opening of valves 10 and 16 and operation of auxiliary pump 12. Through valve 10, the pretreated slurry is charged to the conventional Bayer process digestion step and the entire pretreatment cycle can be repeated. To smooth the cyclic nature of the system, multiple, series-connected, float-type pumps can be employed both in the first and fourth stages of the instant pretreatment system.

Although the pretreatment system of the present invention has been described in detail, it becomes evident to persons skilled in the art that many variations and modifications may be made to the system described without, however, departing from the spirit therefrom, which is only limited by the scope of the appended claims.

I claim:

1. A stage-wise pretreatment process for goethite-containing bauxite slurries for the conversion of the goethite-content to hematite and/or magnetite at temperatures in excess of about 260° C and at elevated pressures prior to the conventional Bayer process digestion of the bauxite for the extraction of its alumina content which comprises introducing a thick slurry into a bauxite slurry charging stage consisting of at least one float-type liquid displacement pump, the pump being capable of imparting to the slurry a pressure at least about equivalent to the vapor pressure of steam at about 260° C; transferring the pressurized slurry to a slurry heating stage which is connected to the pump for receiving the pressurized slurry and for heating the pressurized slurry to the goethite to hematite and/or magnetite conversion temperature; pumping the heated and pressurized slurry to a cooling stage to reduce the temperature of the slurry without flashing off steam to about the temperature conventionally utilized for the digestion of bauxites; introducing the cooled and pressurized slurry to a slurry discharge stage which is connected to the cooling stage, the slurry discharge stage consisting of at least one float-type, liquid displacement pump from which the cooled slurry is charged without flashing off steam into the conventional Bayer process digestion vessels by displacing it with a liquid.

2. Pretreatment process of claim 1, wherein both in the slurry charging stage and in the slurry discharge stage multiple numbers of float-type, liquid displacement pumps are employed.

3. Pretreatment process of claim 1, wherein in the slurry discharge stage, a portion of the pressure of the cooled and pressurized slurry is utilized to displace liquid at high pressure from the pump.

4. Pretreatment process of claim 1, wherein the liquid displaced under pressure from the slurry discharge pump is employed to displace bauxite slurry from the slurry charging stage.

5. Pretreatment process of claim 1, wherein the bauxite slurry introduced into the slurry charging stage has a solids concentration in excess of about 30% by weight.

6. Pretreatment process of claim 1, wherein the bauxite slurry introduced into the slurry charging stage has a solids concentration in the range of about 30 to about 60% by weight.

7. Pretreatment process of claim 1, wherein the bauxite slurry in the heating stage is heated to a temperature in the range of about 265° to about 315° C.

* * * * *